Figure 3:
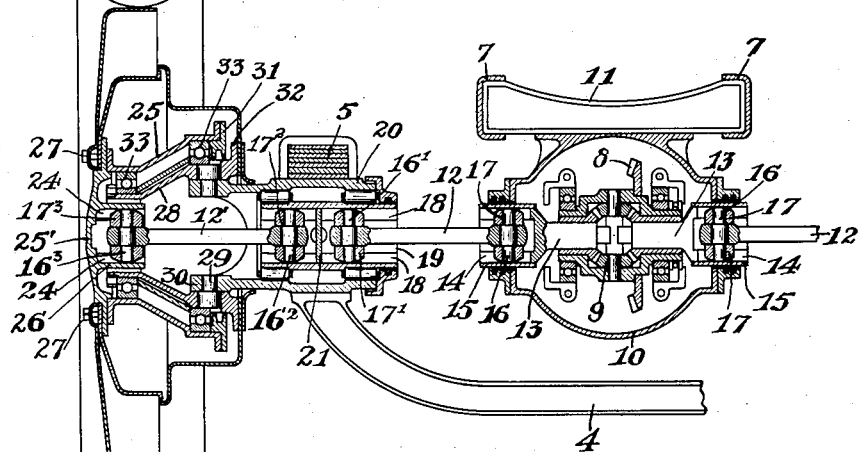

March 1, 1932.   R. BUSSIEN   1,847,749
MOTOR VEHICLE
Filed March 18, 1929   2 Sheets-Sheet 1

Fig. 1.

Inventor:
Richard Bussien
By his Attorney

March 1, 1932. R. BUSSIEN 1,847,749
MOTOR VEHICLE
Filed March 18, 1929  2 Sheets-Sheet 2

Inventor:
R. Bussien
By John O. Seifert
Attorney

Patented Mar. 1, 1932

1,847,749

UNITED STATES PATENT OFFICE

RICHARD BUSSIEN, OF BERLIN, GERMANY, ASSIGNOR TO VORAN AUTOMOBILBAU-AKTIENGESELLSCHAFT, OF BERLIN, GERMANY

MOTOR VEHICLE

Application filed March 18, 1929, Serial No. 347,962, and in Germany July 6, 1928.

This invention relates to motor vehicles of the front wheel drive type where the front wheels function as combined steering and driving wheels for the vehicle, as disclosed in Patent No. 1,794,145, issued to me February 24, 1931, and the application for which patent was co-pending herewith, and it is an object of the invention to provide an improved construction of the driving connection mechanism between the driving wheels of the vehicle and the motive means for the vehicle frame to particularly adapt the same to the heavier type of motor vehicles.

It is a further object of the invention to provide in vehicles of this character an improved construction and arrangement of rigid axle and spring suspension for the vehicle frame therefrom, which axle also rigidly connects and supports the driving wheels, and to so arrange the driving shafts for the wheels and the connection of said shafts that the driving wheels and differential gearing to compensate for movements of the vehicle frame and axle relative to each other without transmitting such movement to the driving wheels and obviate the setting up of strains and stresses in the parts, and to permit of independent movement of the driving wheels to variable angular positions relative to the driving shafts on an axis extending in the plane of rotation of the wheels to effect steering of the vehicle.

In the drawings accompanying and forming a part of this application I have shown an embodiment of the invention in which Figure 1 is a diagrammatic view to illustrate the connections of the wheel with the motive means of the vehicle.

Figure 2:
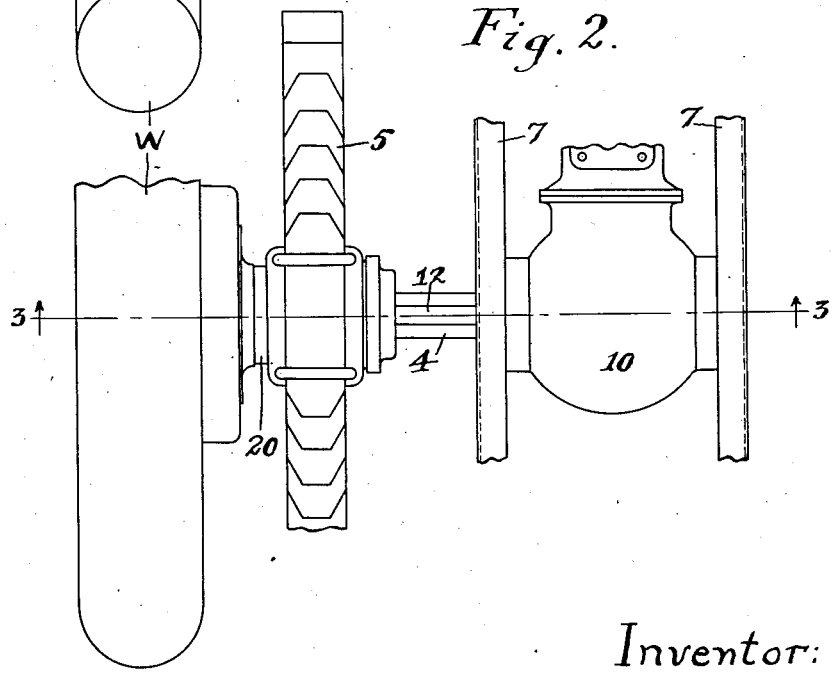

Figure 2 is a plan view showing the application of my invention to a motor vehicle, only so much of the vehicle being shown as is essential to an understanding of the invention; and Figure 3 is a sectional view taken substantially on the line 3—3 of Figure 2 looking in the direction of the arrows.

In the embodiment of the invention illustrated there is provided a rigid axle 4 of eye-form in cross section from which the chassis frame is supported by springs 5 of any conventional form secured intermediate the ends to and supported from the axle. The springs extend in the plane of the side members 7 of the frame and at opposite sides of the longitudinal axis of the vehicle and connected with said frame members in the conventional manner to provide a secure and positive connection between the vehicle frame and axle.

The combined steering and driving wheels W are operatively connected with the driving shaft of power or motive means for the vehicle through a gear 8 of differential gearing 9 carried in a housing or casing 10 fixed to and carried by the vehicle frame, as from a cross bar 11 fixed to and supported from the side members of the frame.

The differential gearing is operatively connected with the combined driving and steering wheels W through shafts 12, 12' extended laterally and oppositely from the differential housing, and as said connections of the both wheels are the same illustration and description of one will suffice for both. The shafts 12 are rotatably supported at the inner ends and flexibly connected with driving elements 13 of the differential gearing to have axial and universal movement. For this purpose said driving elements 13 are arranged with bifurcated portions 14 whereby they are rotatably supported in bushings 15 in bearings in the opposite sides of the differential housing, said bearings also being arranged as supports for the differential gearing within the housing. The inner ends of the shafts 12 are pivotally mounted on pins 16 with blocks or rollers 17 pivotally mounted upon the opposite projecting ends of said pins engaging in the bifurcated portions 14 to couple the shafts 12 with the driving elements 13 of the differential gearing and permit of the shafts to have universal and axial movement relative to said elements.

The shafts 12, 12' are operatively coupled to have independent axial and universal movement one relative to the other. For this purpose the outer end of shaft 12 and the inner end of shaft 12' are arranged with a universal joint element constructed the same as the coupling member at the inner end of shaft 12 and embody pins $16^1$ and $16^2$ upon which the shafts are pivotally engaged with rollers or blocks 17¹, 17² pivotally mounted upon the opposite projecting ends of said pins slidably engaging a bifurcation in the form of diametrically opposite slots or slideways 18 in a sleeve 19 rotatable in a bearing box or member 20 fixed upon the axle and upon which member the suspension spring 5 is secured. The shafts 12, 12' are maintained in spaced relation in the sleeve 19 by a transverse member in sleeve 19 interposed between the ends of the shafts, as at 21. The bearing box 20 is fixed upon the axle 4 so that in the normal position of the frame relative to the axle the bearing member 20 will be substantially in co-axial relation to the driving element 13 of the differential gearing.

The outer end of the shaft 12' has a flexible connection with the hub 25 of the wheel similar to the connections 16², 16¹ thereof with shaft 12 and the connection 16 of said latter shaft with the differential gearing, and comprises a pin 16³ upon which the end of the shaft is pivotally engaged with blocks or rollers 17³ engaged upon the opposite projecting ends of said pin and engaging bifurcations in the form of diametrically opposite slots or slideways 24 in a tubular portion 26 extended inward from and integral with a hub closure cap or disk 25' and secured to the hub, as by screws 27, to constitute a part of the hub.

The wheel carrying hub is carried by the bearing box 20 to rotate and have movement on a vertical axis or an axis extending in the plane of rotation of the wheel, through a knuckle member 28 serving as the hub stub or spindle supported upon the bearing box to have movement on a vertical axis by pins 29 engaging perforations in said knuckle member and supported in knuckles 30 extended from the end of the bearing box 20 into the hub. The hub is rotatably mounted upon the knuckle member by anti-friction bearings 33. An annular member 31 is interposed between the end of the hub and a laterally extended annular flange 32 of the knuckle member to arrange the hub as a lubricant carrying housing. The connection 29 of the knuckle member with the bearing box is arranged so that the couplings 16³, 16² of the shaft 12' with the hub cap and shaft 12 are at opposite sides of said connection. By this arrangement of the couplings 16³, 16² of the shaft 12', and by the provision of the coupling 16' between the shafts 12' and 12 axial displacement of the shaft 12' only is effected when the wheel is deflected in steering, while the coupling 16', 16 will function to compensate for the movement of the vehicle frame and axle 4 relative to each other and thus obviate the setting up of undue stresses and strains in the parts.

By the use of the joints 16', 16² between the shafts 12, 12' it is possible to make the shafts not only of equal length but also exactly alike in all other respects whereby the manufacture costs are reduced. Furthermore, it is not necessary to provide the hollow spherical oscillatory bearing for mounting the inner shaft 12, as in the structure of my patent hereinbefore referred to, so that a simplified and improved structure is produced. Also the axle stubs $a$ of the bearing members 20 for the wheels are connected and supported by the axle 4 whereby the forces of the strains and stresses are taken up in the axle.

It will be obvious that various modifications may be made in the construction and arrangement of parts without departing from the scope of the invention, and that portions of the invention may be used without others and come within the scope of the invention.

Having thus described my invention, I claim:

1. In driving means for motor vehicles, differential gearing, a wheel, a shaft having a universal joint connection with a driving element of the differential gearing, a shaft having a universal joint connection with the wheel, and means with which each shaft is connected to connect the shafts and adapt the shafts to assume independent variable angular positions relative to each other.

2. In driving means for motor vehicles, differential gearing, a wheel, a pair of shafts, means to connect the shafts having a flexible connection with one shaft and a flexible connection with the other shaft, a flexible connection between one shaft and the wheel, and a flexible connection between the other shaft and a driving element of the differential gearing.

3. In driving means for motor vehicles, differential gearing, a wheel, a shaft connected with a driving element of the differential gearing to have axial and universal movement relative to said driving element, a second shaft, means to connect the second shaft with the wheel arranged to permit of universal movement of the wheel and said shaft relative to each other and axial movement of the shaft relative to the wheel, and means to connect the shafts to have independent axial and universal movement relative to each other.

4. In a motor vehicle, the combination with differential gearing and a wheel, of a pair of shafts, means to connect the shafts to permit of independent movement of the shafts in angular relation to each other, and flexible connections between the one shaft with the differential gearing and the other shaft with the wheel.

5. In a motor vehicle, a rigid axle, differential gearing and a housing therefor, bearing members fixed upon the axle, wheel carrying hubs, means to mount the wheel hubs upon the bearing members to rotate and have movement on a vertical axis in the plane of rotation of the wheels, and means to connect the wheels with the differential gearing comprising a pair of shafts, flexible connections between the shafts, wheel hubs and driving elements of the differential gearing, means rotatable in the bearing members, and independent flexible connections between the shafts and said means rotatable in the bearings to connect the shafts and permit of independent movement of the shafts to different angular positions relative to each other.

6. A motor vehicle as claimed in claim 5, wherein the means rotatable in the bearings comprises sleeves retained in the bearings and independent flexible connections between the shafts and sleeves, and the connections of the shafts with the sleeves, wheel hubs and driving elements of the differential gearing being arranged to permit of independent axial movement of the shafts.

7. In a motor vehicle, differential gearing, a rigid axle, a wheel, means to support the wheel from the axle to rotate and have movement on a vertical axis in the plane of rotation of the wheel, and means for connecting the wheel with the differential gearing comprising a pair of shafts, one shaft having a flexible connection with the differential gearing and the other shaft a flexible connection with the wheel, a sleeve rotatably carried by the wheel support on the axle, and independent flexible connections between the shafts and said sleeve.

8. The combination in a motor vehicle of an axle, a casing carrying differential gearing the driving elements of which gearing are arranged with a bifurcated portion and whereby said elements are journaled in opposite sides of the casing, wheel carrying hubs carried by the axle to rotate and have movement on a vertical axis, sleeves arranged with bifurcations therein rotatably carried by the axle, and means to connect the wheel carrying hubs with the differential gearing comprising pairs of shafts, one shaft of each pair of shafts having a flexible connection with the bifurcated portion of the driving elements of the differential gearing and bifurcation of the sleeves, and the other shafts having flexible connection with the bifurcation of the sleeves and a bifurcation in an axially inwardly extending sleeve portion of the wheel hubs.

9. A motor vehicle as claimed in claim 8, wherein the flexible connections of the shafts with the driving elements of the differential gearing, the sleeves and the hubs are arranged to permit of the shafts to have axial movement and movement to different angular positions one independent of the other.

10. A motor vehicle as claimed in claim 8, wherein the means to mount the wheel hubs on the axle comprises stubs arranged with knuckles and bearing members mounted on the axle having knuckles adapted to be extended into the stubs, and pins engaged in perforations in the knuckles of the stubs and bearing members to mount the stubs on the bearing members to have adjustment on a vertical axis and upon which stubs the hubs are mounted to rotate and participate in the movement of the stubs.

11. A motor vehicle as claimed in claim 8, wherein the flexible connections of the shaft with the driving elements of the differential gearing, the sleeves and hubs comprise pins pivotally engaging the ends of the shafts and blocks on the pins to slidably engage the said bifurcated portion of the driving elements of the differential gearing, the sleeves and the hubs.

12. A motor vehicle as claimed in claim 8, wherein the sleeves are mounted to rotate in bearing members fixed to the axle and by which bearing members the wheel hubs are carried to rotate and have movement on a vertical axis.

13. A motor vehicle as claimed in claim 8, wherein the sleeves are mounted to rotate in bearings fixed to the axle, and the means to mount the wheel hubs to rotate and have movement on a vertical axis comprise stubs having knuckles, pins upon which the knuckles of the stubs are pivotally engaged and said pins supported in knuckles of the bearing members, and anti-friction bearings to rotatably mount the hubs upon the stubs.

In testimony whereof I have affixed my signature.

RICHARD BUSSIEN.